United States Patent
Missfeldt

Patent Number: 5,858,639
Date of Patent: Jan. 12, 1999

[54] PHOTOGRAPHIC RECORDING MATERIAL

[75] Inventor: Michael Missfeldt, Leichlingen, Germany

[73] Assignee: Agfa-Gevaert AG, Germany

[21] Appl. No.: 816,416

[22] Filed: Mar. 13, 1997

[30] Foreign Application Priority Data

Mar. 18, 1996 [DE] Germany ............ 196 10 533.1

[51] Int. Cl.$^6$ .................................... G03C 1/12
[52] U.S. Cl. ................. 430/584; 430/572; 430/581; 430/583; 430/585
[58] Field of Search ................. 430/584, 572, 430/581, 583, 585

[56] References Cited

U.S. PATENT DOCUMENTS 5,258,272  11/1993  Ogawa ........................ 430/584

OTHER PUBLICATIONS

Chem. Pharm.Bull., 30 (1982), Isao et al (search report, pp. 1–7).

Primary Examiner—Thorl Chea
Attorney, Agent, or Firm—Connolly & Hutz

[57] ABSTRACT

A photographic recording material with at least one light-sensitive silver halide emulsion layer, the silver halide of which is spectrally sensitised with at least one cyanine dye having the general formula (I)

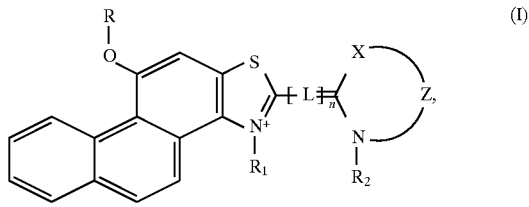

wherein

X means O, S, Se, $NR_3$ or —CH=CH—,

R means alkyl, n means 1, 3, 5, 7

$R_1$, $R_2$, $R_3$ mean alkyl, arylalkyl, sulphoalkyl, carboxyalkyl, —$(CH_2)_m$—$SO_2$—NH—$SO_2$-alkyl, —$(CH_2)_m$—$SO_2$—NH—CO-alkyl, —$(CH_2)_m$—CO—NH—$SO_2$-alkyl, —$(CH_2)_m$—CO—NH—CO-Alkyl, L means an optionally substituted methine group, m means a number from 1 to 5, and Z means the radical required to complete an optionally substituted thiazoline, thiazole, benzothiazole, naphthothiazole, phenanthrothiazole, anthrathiazole, 2-quinoline, 4-quinoline, indole, oxazole, benzoxazole, naphthoxazole, phenanthrooxazole, anthraoxazole, selenazole, benzselenazole, naphthoselenazole, imidazole, benzimidazole or naphthoimidazole and wherein the substituents of at least two methine groups may be linked to rings, is characterised by improved sensitivity.

13 Claims, No Drawings

PHOTOGRAPHIC RECORDING MATERIAL

The invention relates to a photographic silver halide recording material with at least one light-sensitive silver halide emulsion layer containing at least one dye having the formula (I):

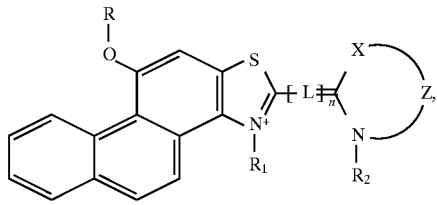

wherein
X means O, S, Se, $NR_3$ or —CH=CH—,
R means alkyl,
n means 1, 3, 5, 7,
$R_1$, $R_2$, $R_3$ mean alkyl, arylalkyl, sulphoalkyl, carboxyalkyl, —$(CH_2)_m$—$SO_2$—NH—$SO_2$-alkyl, —$(CH_2)_m$—$SO_2$—NH—CO-alkyl, —$(CH_2)_m$—CO—NH—$SO_2$-alkyl, —$(CH_2)_m$—CO—NH—CO-alkyl,
L means an optionally substituted methine group,
m is a number from 1 to 5, and
Z means the radical required to complete an optionally substituted thiazoline, thiazole, benzothiazole, naphthothiazole, phenanthrothiazole, anthrathiazole, 2-quinoline, 4-quinoline, indole, oxazole, benzoxazole, naphthoxazole, phenanthrooxazole, anthraoxazole, selenazole, benzselenazole, naphthoselenazole, imidazole, benzimidazole or naphthoimidazole,
and the substituents of at least 2 methine groups may be linked to rings.

Silver halide emulsions are inherently sensitive only to blue and ultraviolet light. By adding methine dyes, it is possible to bring about a bathochromic shift in the light sensitivity of silver halide emulsions. The demand for greater spectral sensitivity of silver halide emulsions is met to a particular degree by the cyanines, a sub-class of methine dyes.

A satisfactory sensitivity is achieved with cyanines that contain at least one 8-alkoxynaphthothiazole end group (GB 1 319 496, JP 03/001 132, JP 59/116 645).

The object of the invention was to provide sensitising dyes with which the sensitivity may be further increased without impairing other photographic properties.

This object was achieved surprisingly with the dyes having the formula (I).

The photographic recording material may be a black-white material, but it is preferably a colour photographic silver halide material.

Examples of colour photographic materials are colour negative films, colour reversal films, colour positive films, colour photographic paper, colour reversal photographic paper, colour-sensitive materials for the diffusion transfer process or the silver- dye-bleach process.

The photographic materials are composed of a support to which is applied at least one light-sensitive silver halide emulsion layer. Suitable supports are, in particular, thin films and sheets. A review of support materials and of auxiliary layers applied to the front and back thereof is given in Research Disclosure 37254, Part 1 (1995), page 285.

The colour photographic materials usually contain at least one red-sensitive, one green-sensitive and one blue-sensitive silver halide emulsion layer and optionally intermediate layers and protective layers.

Depending on the type of photographic material, these layers may be arranged in different ways. This will be demonstrated for the most important products.

Colour photographic films such as colour negative films and colour reversal films have on the support, in the sequence given below, 2 or 3 red-sensitive, cyan coupling silver halide emulsion layers, 2 or 3 green-sensitive magenta coupling silver halide emulsion layers, and 2 or 3 blue-sensitive yellow coupling silver halide emulsion layers. The layers with the same spectral sensitivity differ in terms of their photographic sensitivity, the less sensitive partial layers usually being arranged closer to the support than the more sensitive partial layers.

Between the green-sensitive and blue-sensitive layers there is usually arranged a yellow filter layer which prevents blue light from reaching the underlying layers.

The possibilities of the various layer arrangements and their effects on the photographic properties are described in J. Inf. Rec. Mats., 1994, Vol. 22, pages 183–193.

Colour photographic paper, which is usually substantially less light-sensitive than a colour photographic film, usually has on the support, in the sequence given below, one blue-sensitive yellow coupling silver halide emulsion layer, one green-sensitive magenta coupling silver halide emulsion layer and one red-sensitive cyan coupling sliver halide emulsion layer; the yellow filter layer may be absent.

Deviations from the number and arrangement of light-sensitive layers may be made in order to achieve certain results. For example, all the highly sensitive layers may be grouped together to form one packet of layers and all the low-sensitivity layers may be grouped together to form another packet of layers in one photographic film in order to increase the sensitivity (DE 25 30 645).

Important constituents of the photographic emulsion layers are binders, silver halide grains and colour couplers.

Details about suitable binders may be found in Research Disclosure 37254, Part 2 (1995), page 286.

Details about suitable silver halide emulsions, their preparation, ripening, stabilisation and spectral sensitisation may be found in Research Disclosure 37254, Part 3 (1995), page 286 and in Research Disclosure 37038, Part XV (1995), page 89. Compounds having the formula (I) are used as spectral sensitisers in at least one silver halide emulsion.

Photographic materials with camera sensitivity usually contain silver bromide iodide emulsions which may optionally also contain small proportions of silver chloride. Photographic copier materials contain either silver chloride bromide emulsions with up to 80 mol-% of AgBr or silver chloride bromide emulsions with more than 95 mol-% of AgCl.

Details about colour couplers may be found in Research Disclosure 37254, Part 4 (1995), page 288 and in Research Disclosure 37038, Part II (1995), page 80. The maximum absorption of the dyes formed from the couplers and the colour developer oxidation product is preferably in the following ranges: yellow coupler 430 to 460 nm, magenta coupler 540 to 560 nm, cyan coupler 630 to 700 nm.

In order to improve sensitivity, granularity, sharpness and colour separation in colour photographic films, compounds are frequently used which, during the reaction with the developer oxidation product, release compounds which are photographically effective, e.g. DIR couplers which split off a developing restrainer.

Details about such compounds, particularly couplers, may be found in Research Disclosure 37254, part 5 (1995), page 290 and in Research Disclosure 37038, Part XIV (1995), page 86.

Most hydrophobic colour couplers, but also other hydrophobic constituents of the layers, are usually dissolved or dispersed in high-boiling organic solvents. Said solutions or dispersions are then emulsified in an aqueous binder solution (usually gelatin solution) and after the layers have dried are present as fine droplets (0.05 to 0.8 μm diameter) in the layers.

Suitable high-boiling organic solvents, methods of introduction into the layers of a photographic material, and other methods of introducing chemical compounds into photographic layers may be found in Research Disclosure 37254, Part 6 (1995), page 292.

The non light-sensitive intermediate layers usually arranged between layers of differing spectral sensitivity may contain agents which prevent unwanted diffusion of developer oxidation products from one light-sensitive layer into another light-sensitive layer with different spectral sensitisation.

Suitable compounds (white couplers, scavengers or DOP scavengers) may be found in Research Disclosure 37254, part 7 (1995), page 292 and in Research Disclosure 37038, part III (1995), page 84.

The photographic material may further contain UV light-absorbing compounds, fluorescent brighteners, spacers, filter dyes, formalin scavengers, light stabilisers, antioxidants, $D_{min}$ dyes, additives to improve the dye stability, coupler stability and white stability, and to reduce fog, plasticisers (latices), biocides and others. Suitable compounds may be found in Research Disclosure 37254, Part 8 (1995), page 292. and in Research Disclosure 37038, Parts IV, V, VI, VII, X, XI and XII (1995), page 84 ff.

The layers of colour photographic materials are usually hardened i.e. the binder used, preferably gelatin, is cross-linked by suitable chemical processes.

Suitable hardener substances may be found in Research Disclosure 37254, Part 9 (1995), page 294 and in Research Disclosure 37038, Part XII (1995), page 86.

After image exposure, colour photographic materials are processed by various methods according to their character. Details about methods of operating and the chemicals required are publised together with materials given by way of example in Research Disclosure 37254, Part 10 (1995), page 294 and in Research Disclosure 37038, Parts XVI to XXIII (1995), page 95 ff.

In a preferred embodiment of the invention the sensitizing dye corresponds to formula Ia

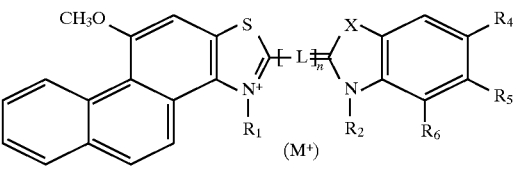

wherein
  X means O, S, Se or $NR_3$ ($R_6$ alkyl with 1 to 4 carbon atoms);
  L means an optionally substituted methine group;
  n means 1, 3 or 5;
  $R_4$, $R_5$, $R_6$ independently mean H, halogen, alkyl, alkoxy, aryl, N-pyrrolyl, 2-thienyl, 3-thienyl, 2-furanyl or 3-furanyl; or
  $R_4$ and $R_5$ mean

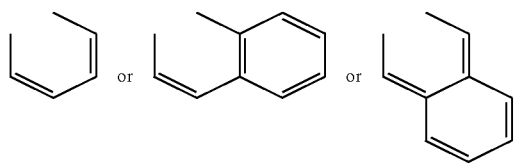

or
  $R_5$ and $R_6$ mean

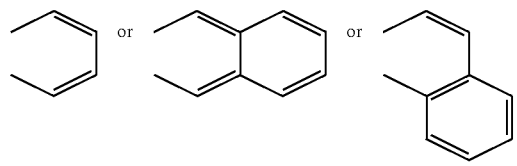

Examples of dyes having the formula (I) are given below:

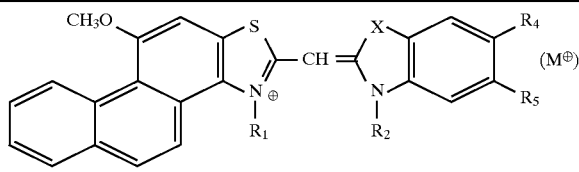

| No. | X | $R_1$ | $R_2$ | $R_4$ | $R_5$ | $R_6$ | M |
|---|---|---|---|---|---|---|---|
| I-1 | S | $-(CH_2)_2SO_3^\ominus$ | $(CH_2)_3SO_3^\ominus$ | H | Cl | H | $HN(C_2H_5)_3$ |
| I-2 | S | $-(CH_2)_2CH(CH_3)SO_3^\ominus$ | $-(CH_2)_3SO_3^\ominus$ | H | $CH_3$ | H | K |
| I-3 | S | $-(CH_2)_3SO_3^\ominus$ | $-(CH_2)_4SO_3^\ominus$ | $CH_3$ | $CH_3$ | H | $HN(C_2H_5)_3$ |
| I-4 | S | $-(CH_2)_3SO_3^\ominus$ | $-C_2H_5$ | $CH_3$ | Cl | H | — |
| I-5 | S | $-C_2H_5$ | $-(CH_2)_3SO_3^\ominus$ | Cl | $CH_3$ | H | — |
| I-6 | S | $-(CH_2)_2CH(CH_3)SO_3^\ominus$ | $-(CH_2)_2COOH$ | $OCH_3$ | $CH_3$ | H | — |
| I-7 | S | $-C_2H_5$ | $-(CH_2)_3SO_3^\ominus$ | H | $-CH=CH-CH=CH-$ | | — |
| I-8 | S | $-(CH_2)_3SO_3^\ominus$ | $-(CH_2)_3SO_3^\ominus$ | $OCH_3$ | $-CH=CH-CH=CH-$ | | Na |
| I-9 | S | $-(CH_2)_3SO_3^\ominus$ | $-(CH_2)_4SO_2N^\ominus COCH_3$ | $-CH=CH-CH=CH-$ | | H | Na |
| I-10 | $-CH=CH-$ | $-(CH_2)_3SO_3^\ominus$ | $-(CH_2)_3SO_3^\ominus$ | $OCH_3$ | H | H | K |
| I-11 | O | $-(CH_2)_3SO_3^\ominus$ | $-(CH_2)_2SO_3^\ominus$ | H | [phenyl-Cl] | H | K |
| I-12 | O | $-(CH_2)_3SO_3^\ominus$ | $-(CH_2)_3SO_3^\ominus$ | H | Cl | H | K |
| I-13 | O | $-(CH_2)_3SO_3^\ominus$ | $-(CH_2)_3SO_3^\ominus$ | H | $-CH=CH-CH=CH-$ | | Na |
| I-14 | O | $-(CH_2)_3SO_3^\ominus$ | $-(CH_2)_3CONHCOCH_3$ | $-CH=CH-=CH-$ | | H | — |

-continued

| No. | X | R1 | R2 | R4 | R5 | R6 | M |
|---|---|---|---|---|---|---|---|
| I-15 | O | —(CH$_2$)$_3$SO$_3^\ominus$ | —(CH$_2$)$_3$SO$_3^\ominus$ | H | —C=C—CH=CH— (fused benzo) | | Na |
| I-16 | O | —(CH$_2$)$_3$SO$_3^\ominus$ | —(CH$_2$)$_3$SO$_3^\ominus$ | H | —CH=C—C=CH— (fused benzo) | | HN(C$_2$H$_5$)$_3$ |
| I-17 | O | —(CH$_2$)$_3$SO$_3^\ominus$ | —(CH$_2$)$_3$SO$_2$NSO$_2$CH$_3$ | —CH=C=C=CH— (fused benzo) | | H | — |
| I-18 | NC$_2$H$_5$ | —(CH$_2$)$_3$SO$_3^\ominus$ | —(CH$_2$)$_3$SO$_3^\ominus$ | Cl | Cl | H | K |
| I-19 | Se | —(CH$_2$)$_3$SO$_3^\ominus$ | —(CH$_2$)$_3$SO$_3^\ominus$ | OCH$_3$ | CH$_3$ | H | K |
| I-20 | S | —(CH$_2$)$_3$SO$_3^\ominus$ | —(CH$_2$)$_3$SO$_3^\ominus$ | OCH$_3$ | —C=C—CH=CH— (fused benzo) | | K |
| I-21 | S | —(CH$_2$)$_3$SO$_3^\ominus$ | —(CH$_2$)$_3$SO$_3^\ominus$ | H | —CH=C—C=CH— (fused benzo) | | K |

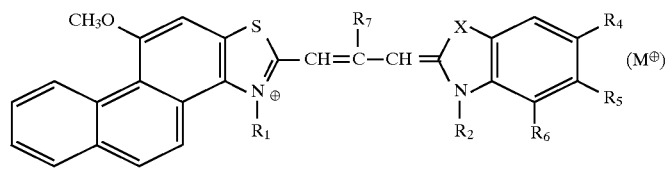

| No. | X | R1 | R2 | R4 | R5 | R6 | R7 | M |
|---|---|---|---|---|---|---|---|---|
| I-22 | O | (CH$_2$)$_3$SO$_3^\ominus$ | —(CH$_2$)$_3$SO$_3^\ominus$ | H | phenyl | H | —C$_2$H$_5$ | HN(C$_2$H$_5$)$_3$ |
| I-23 | O | —(CH$_2$)$_3$SO$_3^\ominus$ | —(CH$_2$)$_3$SO$_3^\ominus$ | H | Cl | H | —C$_2$H$_5$ | K |
| I-24 | O | —(CH$_2$)$_3$SO$_3^\ominus$ | —(CH$_2$)$_3$SO$_3^\ominus$ | H | 4-Cl-phenyl | H | —C$_2$H$_5$ | K |
| I-25 | O | —(CH$_2$)$_3$SO$_3^\ominus$ | —(CH$_2$)$_2$CH(CH$_3$)SO$_3^\ominus$ | —CH=CH—CH=CH— | | H | —C$_2$H$_5$ | K |
| I-26 | O | —(CH$_2$)$_3$SO$_3^\ominus$ | —(CH$_2$)$_3$SO$_3^\ominus$ | H | —CH=CH—CH=CH— | | —C$_2$H$_5$ | Na |
| I-27 | NC$_2$H$_5$ | —C$_2$H$_5$ | —(CH$_2$)$_3$SO$_2$N$^\ominus$COCH$_3$ | Cl | Cl | H | H | — |
| I-28 | NC$_2$H$_5$ | —(CH$_2$)$_3$SO$_3^\ominus$ | —C$_2$H$_5$ | Cl | CN | H | H | — |
| I-29 | NC$_2$H$_5$ | —(CH$_2$)$_3$SO$_3^\ominus$ | —(CH$_2$)$_3$SO$_3^\ominus$ | H | CN | H | H | Na |
| I-30 | S | —(CH$_2$)$_3$SO$_3^\ominus$ | —(CH$_2$)$_3$SO$_3^\ominus$ | H | Cl | H | —C$_2$H$_5$ | Na |
| I-30 | S | —(CH$_2$)$_3$SO$_3^\ominus$ | —(CH$_2$)$_3$SO$_3^\ominus$ | H | Cl | H | —C$_2$H$_5$ | Na |
| I-31 | S | —CH$_2$)$_3$SO$_3^\ominus$ | —(CH$_2$)$_3$SO$_3^\ominus$ | H | —CH=CH—CH=CH— | | —C$_2$H$_5$ | K |
| I-32 | S | —(CH$_2$)$_3$SO$_3^\ominus$ | —(CH$_2$)$_2$CH(CH$_3$)SO$_3^\ominus$ | —CH=CH—CH=CH— | | H | —C$_2$H$_5$ | Li |
| I-33 | —CH=CH— | —(CH$_2$)$_3$SO$_3^\ominus$ | —(CH$_2$)$_3$SO$_3^\ominus$ | H | H | H | —C$_2$H$_5$ | K |
| I-34 | S | —(CH$_2$)$_3$SO$_3^\ominus$ | —(CH$_2$)$_3$SO$_3^\ominus$ | CH$_3$ | CH$_3$ | H | —C$_2$H$_5$ | K |
| I-35 | S | —C$_2$H$_5$ | —(CH$_2$)$_3$SO$_3^\ominus$ | CH$_3$ | OCH$_3$ | H | —C$_2$H$_5$ | HN(C$_2$H$_5$)$_3$ |
| I-36 | S | —(CH$_2$)$_3$SO$_3^\ominus$ | —(CH$_2$)$_3$SO$_3^\ominus$ | H | —C=C—CH=CH— (fused benzo) | | —C$_2$H$_5$ | HN(C$_2$H$_5$)$_3$ |
| I-37 | O | —(CH$_2$)$_3$SO$^\ominus$ | —(CH$_2$)$_3$SO$_3^\ominus$ | H | —C=C—CH=CH— (fused benzo) | | —C$_2$H$_5$ | HN(C$_2$H$_5$)$_3$ |
| I-38 | S | —(CH$_2$)$_2$CH(CH$_3$)SO$_3^\ominus$ | —(CH$_2$)$_2$CH(CH$_3$)SO$_3^\ominus$ | OCH$_3$ | —CH=CH—CH=CH— | | —C$_2$H$_5$ | K |
| I-39 | S | —(CH$_2$)$_3$SO$_3^\ominus$ | —(CH$_2$)$_3$SO$_3^\ominus$ | OCH$_3$ | CH$_3$ | H | —C$_2$H$_5$ | HN(C$_2$H$_5$)$_3$ |

-continued

| No. | | | | | | | |
|---|---|---|---|---|---|---|---|
| I-40 | O | $-(CH_2)_3SO_3^{\ominus}$ | $-(CH_2)_3SO_3^{\ominus}$ | $-CH=C-C=CH-$ (with fused benzene) | H | $-C_2H_5$ | $HN(C_2H_5)_3$ |
| I-41 | O | $-(CH_2)_3SO_3^{\ominus}$ | $-(CH_2)_3SO_3^{\ominus}$ | $-CH=CH-C=C-$ (with fused benzene) | H | $-C_2H_5$ | K |
| I-42 | O | $-(CH_2)_3SO_3^{\ominus}$ | $-(CH_2)_3SO_3^{\ominus}$ | H | $-CH=C-C=CH-$ (with fused benzene) | $-C_2H_5$ | $NH(C_2H_5)_3$ |
| I-43 | S | $-(CH_2)_3SO_3^{\ominus}$ | $-C_2H_5$ | $OCH_3$ | $CH_3$ | H | $-C_2H_5$ | — |
| I-44 | S | $-(CH_2)_3SO_3^{\ominus}$ | $-(CH_2)_3SO_3^{\ominus}$ | H | (thiophene) | H | $-C_2H_5$ | Na |
| I-45 | Se | $-(CH_2)_3SO_3^{\ominus}$ | $-(CH_2)_3SO_3^{\ominus}$ | $OCH_3$ | $CH_3$ | H | $-C_2H_5$ | K |
| I-46 | S | $-(CH_2)_3SO_3^{\ominus}$ | $-(CH_2)_3SO_3^{\ominus}$ | $OCH_3$ | $-C=C-CH=CH-$ (with fused benzene) | | $-C_2H_5$ | Na |

I-47

[Structure of dye I-47: phenanthrene with OCH₃ substituent, linked via N⁺–(CH₂)₃–SO₃⁻ bearing thiazoline system to second thiazoline ring with N–C₂H₅, through CH=C(C₂H₅)–CH= chain]

I-48

[Structure of dye I-48: phenanthrene with OCH₃ substituent, linked via N⁺–(CH₂)₃–SO₃⁻ bearing thiazole system through CH=C(C₂H₅)–CH= chain to 4,5-diphenylthiazole with N–C₂H₅]

Other dyes correspond to the following general formula

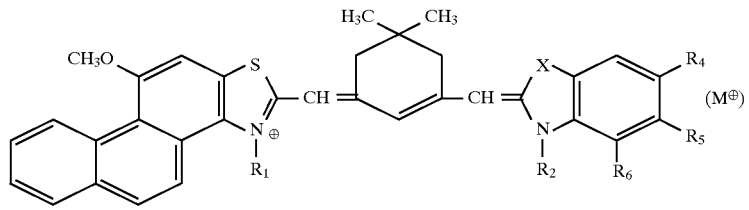

| No. | X | $R_1$ | $R_2$ | $R_4$ | $R_5$ | $R_6$ | M |
|---|---|---|---|---|---|---|---|
| I-49 | S | $-(CH_2)_3SO_3^{\oplus}$ | $C_2H_5$ | H | H | H | — |
| I-50 | S | $C_2H_5$ | $-C_5H_{11}$ | H | Cl | H | $I^{\oplus}$ |

-continued

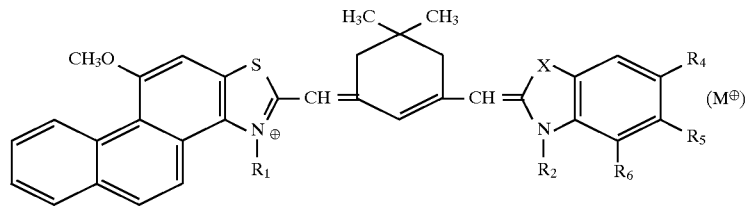

| No. | X | R₁ | R₂ | R₄ | R₅ | R₆ | M |
|---|---|---|---|---|---|---|---|
| I-51 | O | —(CH$_2$)$_3$SO$_3^\ominus$ | C$_2$H$_5$ | H | —C$_6$H$_5$— (phenyl) | H | — |
| I-52 | O | —(CH$_2$)$_3$SO$_3^\ominus$ | —(CH$_2$)$_3$SO$_3^\ominus$ | H | —CH=CH—CH=CH— | | K$^\oplus$ |
| I-53 | O | —(CH$_2$)$_3$SO$_3^\ominus$ | —(CH$_2$)$_3$SO$_3^\ominus$ | H | —C=C—CH=CH— (benzofused) | | Na$^\oplus$ |
| I-54 | S | —(CH$_2$)$_3$SO$_3^\ominus$ | —(CH$_2$)$_3$SO$_3^\ominus$ | OCH$_3$ | —C=C—CH=CH— (benzofused) | | Na$^\oplus$ |
| I-55 | S | —(CH$_2$)$_3$SO$_3^\ominus$ | —(CH$_2$)$_3$SO$_3^\ominus$ | H | —C=C—CH=CH— (benzofused) | | Na$^\oplus$ |
| I-56 | S | —(CH$_2$)$_3$SO$_3^\ominus$ | —(CH$_2$)$_2$CH(CH$_3$)SO$_3^\ominus$ | H | —CH=CH—CH=CH— | | HN(C$_2$H$_5$)$_3^\oplus$ |
| I-57 | S | —(CH$_2$)$_3$SO$_3^\ominus$ | —(CH$_2$)$_3$SO$_3^\ominus$ | H | —CH=C—C=CH— (benzofused) | | Na$^\oplus$ |

I-58

I-59

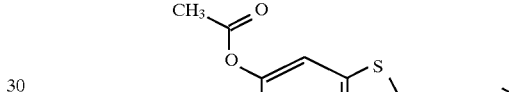
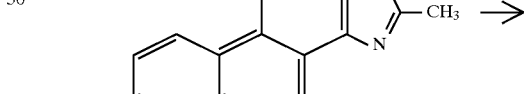
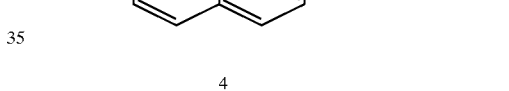
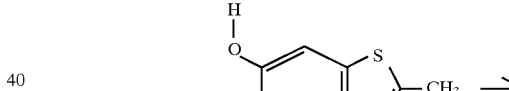
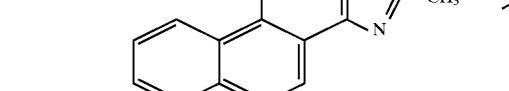

| No. | X | $R_1$ | $R_2$ | $R_4$ | $R_5$ | $R_6$ | M |
|-----|---|-------|-------|-------|-------|-------|---|

I-60

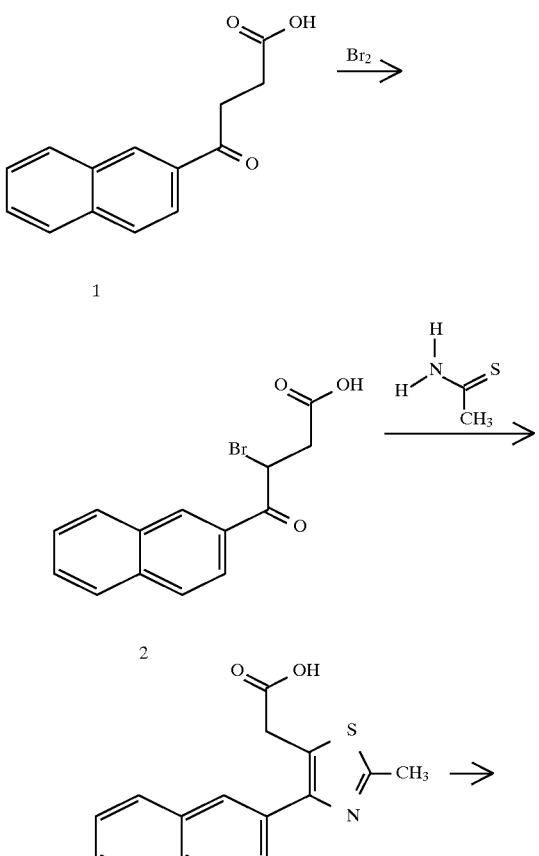

The synthesis of the compounds according to the invention is described on the basis of I-23 and I-7.

The ketocarboxylic acid 1 is prepared according to J.Chem.Soc. 1128 (1932).

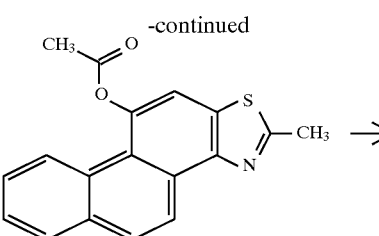

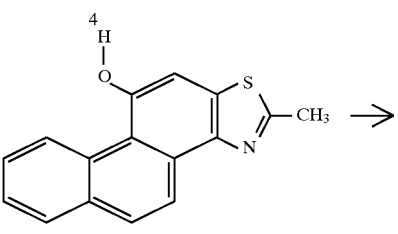

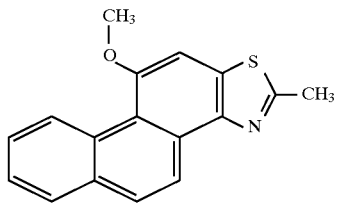

The synthesis of 2 is carried out according to GB 1 574 583. The preparation of 6 via the intermediate stages 3, 4 and 5 takes place according to GB 1 319 496.

5.59 g (20 mmol) of 6 are heated together with 2.44 g (20 mmol) of 1,3-propane sultone for 8 hours at 155° C. After cooling to room temperature, 50 ml of acetone are added, the mixture is refluxed for one hour, allowed to cool to room temperature, the product is removed by suction, washed thoroughly with acetone and the crude product is extracted with 30 ml of methanol by boiling for 2 hours without intermediate drying.

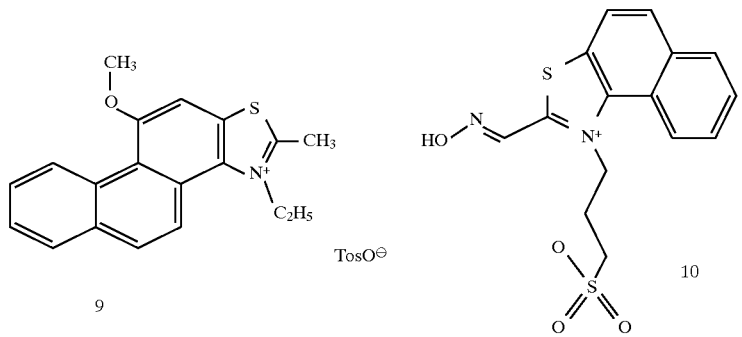

9

Yield: 3.05 g (38% of the theoretical).
The mother liquors are decontaminated with concentrated ammonia solution.
The compound 7 is obtained:

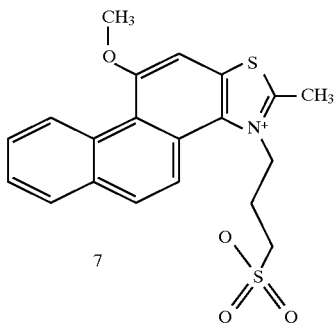

7

The quaternary salt 8 is prepared in the same way as 7.

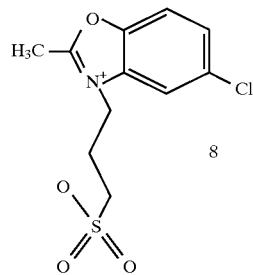

8

Synthesis specification for cyanine I-23

2.25 g (10 mmol) of the quaternary salt 8 are heated together with 1.94 g (11 mmol) of triethyl orthopropionate in 20 ml of m-cresol 1 at 80° C., after which 4.01 g (10 mmol) of the quaternary salt 7 are added and heated together with 3.03 g (30 mmol) of triethylamine at 80° C., with stirring. When the reaction has ended, the mixture is allowed to cool to 60° C. and 2.49 g (15 mmol) of KI dissolved in 50 ml of methanol are metered in over a period of 15 minutes. After cooling to room temperature, stirring is continued for another 3 hours or so in order to complete the precipitation of the dye. The dye is removed by suction, washed thoroughly with methanol and extracted with 60 ml methanol by boiling for 2 hours without further drying.

Yield: 1.46 g (19% of the theoretical).

The quaternary salt 9 is prepared from 6 with ethyl tosylate. The quaternary salt 10 is prepared according to Res. Discl. 182, 301–303 (1979) (TosO$^\ominus$ is the tosylate anion):

10

Synthesis specification for monomethine cyanine I-7

A suspension of 4.5 g (10 mmol) of 9 together with 3.56 g (10 mmol) of 10 in 30 ml of formamide is prepared at room temperature and 3.1 g (30 mmol) of acetic anhydride are added. 3.3 g (33 mmol) of triethylamine are metered in with cooling such that a temperature of 20° C. is not exceeded. After 14 hours' stirring at room temperature, the precipitated dye is removed by suction, washed with acetone and extracted with 50 ml of methanol by boiling for 2 hours without further drying.

Yield: 2.63 g (43% of the theoretical).

The preparation of the cyanines according to the invention may also be carried out by using the synthesis methods described in the "THE CYANINE DYES AND RELATED COMPOUNDS" by Frances M. Hamer, Interscience Publishers (1964).

Not only is a high sensitivity obtained with the sensitising dyes according to the invention but also a stable sensitisation in the blue spectral range between 400 and 490 nm, in the green spectral range between 530 and 590 nm and in the red spectral range between 600 and 680 nm.

R is in particular methyl.

Even greater sensitivity may be achieved when at least one representative of the formula (II) is added to a representative of the formula (I):

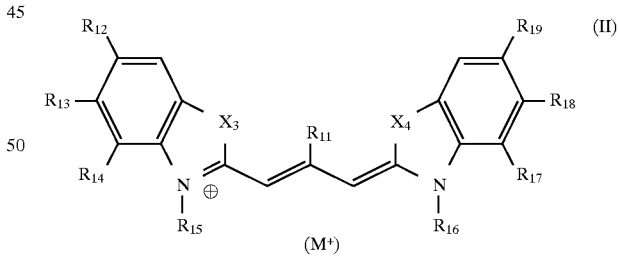

wherein $X_3$, $X_4$ mean O, S, Se or $NR_{20}$, $R_{11}$ means H, $CH_3$ or $C_2H_5$, $R_{12}$, $R_{13}$, $R_{14}$, $R_{17}$, $R_{18}$, $R_{19}$, mean H, alkyl, halogen, CN, aryl, alkoxy or $CF_3$, $R_{15}$, $R_{16}$ mean alkyl, aralkyl, sulphoalkyl, carboxyalkyl, —$(CH_2)_m SO_2 NHSO_2$-alkyl, —$(CH_2)_m SO_2$—NHCO-alkyl, —$(CH_2)_m CONHSO_2$-alkyl or —$(CH_2)_m$—CONHCO-alkyl m means a number from 1 to 5, and $M^+$ means a cation optionally required for charge equalisation, where $R_{12}$ and $R_{13}$, $R_{13}$ and $R_{14}$, $R_{17}$ and $R_{18}$, $R_{18}$ and $R_{19}$ may mean the remaining members of a naphtho-, anthra-, phenanthro- or substituted naphthoazole, where e.g. methoxy and chlorine are suitable substituents of naphthoazoles.

Suitable dyes having the formula (II) are:

II-1: $X_3$, $X_4$=O; $R_{11}$=$C_2H_5$; $R_{12}$, $R_{14}$, $R_{17}$, $R_{19}$=H; $R_{13}$=Cl; $R_{15}$=sulphopropyl; $R_{16}$=sulphoethyl; $R_{18}$=phenyl; $M^+$=$HN(C_2H_5)_3^\oplus$;

II-2: $X_3$, $X_4$=O; $R_{11}$=$C_2H_5$; $R_{12}$, $R_{14}$, $R_{17}$, $R_{19}$=H; $R_{13}$, $R_{18}$=phenyl; $R_{15}$, $R_{16}$=sulphopropyl; $M^+$=$Na^+$;

II-3: $X_3$, $X_4$=O; $R_{11}$=$C_2H_5$; $R_{12}$, $R_{14}$, $R_{17}$, $R_{19}$=H; $R_{13}$, $R_{18}$=phenyl; $R_{15}$, $R_{16}$=sulphoethyl; $M^+$=$HN(C_2H_5)_3^\oplus$;

II-4: $X_3$, $X_4$=O; $R_{11}$=$C_2H_5$; $R_{12}$, $R_{14}$, $R_{17}$, $R_{19}$=H; $R_{13}$, $R_{18}$=Cl; $R_{15}$, $R_{16}$=sulphopropyl; $M^+$=$HN(C_2H_5)_3^\oplus$;

II-5: $X_3$, $X_4$=O; $R_{11}$=$C_2H_5$; $R_{12}$, $R_{14}$, $R_{17}$; $R_{19}$=H; $R_{13}$, $R_{18}$=4-fluorphenyl; $R_{15}$=sulphopropyl; $R_{16}$=$C_2H_5$;

II-6: $X_3$=N—$C_2H_5$; $X_4$=O; $R_{11}$, $R_{14}$, $R_{17}$, $R_{19}$=H; $R_{12}$, $R_{13}$=Cl; $R_{18}$=phenyl; $R_{15}$=sulphopropyl; $R_{16}$=sulphoethyl; $M^\oplus$=$HN(C_2H)_3^\oplus$;

II-7: $X_3$=O; $X_4$=N—$C_2H_5$; $R_{11}$, $R_{12}$, $R_{17}$, $R_{19}$=H; $R_{13}$ and $R_{14}$ together —CH═CH—CH═CH—; $R_{18}$=CN, $R_{15}$=sulphopropyl; $R_{16}$=2-methyl-sulphopropyl; $M^+$=$Na^+$;

II-8: $X_3$=O; $X_4$=N—$C_2H_5$; $R_{11}$, $R_{12}$, $R_{17}$=H; $R_{13}$ and $R_{14}$ together

—C═C—CH═CH—;

$R_{18}$=CN; $R_{19}$=Cl; $R_{15}$, $R_{16}$=sulphopropyl; $M^\oplus$=$K^\oplus$;

II-9: $X_3$, $X_4$=O; $R_{11}$=$C_2H_5$; $R_{12}$, $R_{17}$, $R_{19}$=H; $R_{13}$ and $R_{14}$ together

—C═C—CH═CH—;

$R_{18}$=Cl; $R_{15}$, $R_{16}$=sulphopropyl; $M^\oplus$=$K^\oplus$;

II-10: $X_3$, $X_4$=O; $R_{11}$, $R_{15}$=$C_2H_5$; $R_{12}$, $R_{17}$=H; $R_{13}$ and $R_{14}$ together and $R_{18}$ and $R_{19}$ together —CH═CH—CH═CH—; $R_{16}$=sulphopropyl;

II-11: $X_3$, $X_4$=O; $R_{11}$, $R_{16}$=$C_2H_5$; $R_{12}$, $R_{17}$=H; $R_{13}$ and $R_{14}$ together

—C═C—CH═CH—;

$R_{18}$ and $R_{19}$ together —CH═CH—CH═CH—; $R_{16}$=sulphopropyl;

II-12; $X_3$, $X_4$=O; $R_{11}$=$C_2H_5$; $R_{12}$, $R_{19}$=H; $R_{13}$ and $R_{14}$ together and $R_{17}$ and $R_{18}$ together —CH═CH—CH═CH—; $R_{15}$, $R_{16}$=sulphopropyl; $M^\oplus$=$K^\oplus$;

II-13 $X_3$, $X_4$=O; $R_{11}$=$C_2H_5$; $R_{12}$, $R_{17}$=H; $R_{13}$ and $R_{14}$ together and $R_{18}$ and $R_{19}$ together

—CH═C—C═CH—;

$R_{15}$, $R_{16}$=sulphopropyl; $M^\oplus$=$K^\oplus$;

II-14: $X_3$=S; $X_4$=O; $R_{11}$=$C_2H_5$; $R_{12}$, $R_{13}$=$CH_3$; $R_{14}$, $R_{17}$, $R_{19}$=H; $R_{18}$=phenyl; $R_{15}$=sulphobutyl; $R_{16}$=sulphopropyl; $M^\oplus$=$K^\oplus$;

II-15: $X_3$=S; $X_4$=O; $R_{11}$=$C_2H_5$; $R_{12}$=$OCH_3$, $R_{13}$=$CH_3$; $R_{14}$, $R_{17}$, $R_{19}$=H; $R_{18}$=Cl, $R_{15}$, $R_{16}$=sulphopropyl; $M^\oplus$=$Na^\oplus$;

II-16: $X_3$=S; $X_4$=O; $R_{11}$, $R_{16}$=$C_2H_5$; $R_{12}$, $R_{19}$=H; $R_{13}$ and $R_{14}$ together and $R_{17}$ and $R_{18}$ together —CH═CH—CH═CH—; $R_{15}$=sulphopropyl;

II-17: $X_3$=S; $X_4$=O; $R_{11}$=$C_2H_5$; $R_{12}$=$OCH_3$; $R_{13}$ and $R_{14}$ together —CH═CH—CH═CH—; $R_{17}$, $R_{19}$=H; $R_{18}$=phenyl; $R_{15}$=3-methylsulphopropyl; $R_{16}$=sulphobutyl; $M^\oplus$=$K^\oplus$;

II-18: $X_3$=Se, $X_4$=O; $R_{11}$, $R_{15}$=$C_2H_5$, $R_{12}$=$OCH_3$; $R_{13}$=$CH_3$; $R_{14}$, $R_{19}$=H; $R_{17}$ and $R_{18}$ together —CH═CH—CH═CH—; $R_{16}$=sulphopropyl;

II-19: $X_3$=S; $X_4$=O; $R_{11}$=$C_2H_5$; $R_{12}$, $R_{19}$=H; $R_{13}$ and $R_{14}$ together

—C═C—CH═CH—;

$R_{17}$ and $R_{18}$ together —CH═CH—CH═CH—; $R_{15}$, $R_{16}$=sulphopropyl; $M^\oplus$=$HN(C_2H_5)_3^\oplus$;

II-20: $X_3$, $X_4$=S; $R_{11}$=$C_2H_5$; $R_{12}$, $R_{17}$, $R_{19}$=H; $R_{13}$ and $R_{14}$ together

—C═C—CH═CH—;

$R_{18}$=Cl; $R_{15}$, $R_{16}$=sulphopropyl; $M^\oplus$=$K^\oplus$;

II-21: $X_3$, $X_4$=S; $R_{11}$=$C_2H_5$; $R_{12}$, $R_{14}$, $R_{17}$, $R_{19}$=H; $R_{13}$, $R_{18}$=Cl; $R_{15}$=sulphopropyl; $R_{16}$=carboxyethyl;

II-22: $X_3$, $X_4$=S; $R_{11}$=$C_2H_5$; $R_{12}$, $R_{14}$, $R_{17}$, $R_{19}$=H; $R_{13}$, $R_{18}$=Cl; $R_{15}$, $R_{16}$=sulphopropyl; $M^\oplus$=$HN(C_2H_5)_3^\oplus$;

II-23: $X_3$, $X_4$=S; $R_{11}$=$C_2H_5$; $R_{12}$, $R_{19}$=H; $R_{13}$ and $R_{14}$ together and $R_{17}$ and $R_{18}$ together —CH═CH—CH═CH—; $R_{15}$, $R_{16}$=sulphopropyl; $M^\oplus$=$HN(C_2H_5)_3^\oplus$;

II-24: $X_3$, $X_4$=S; $R_{11}$, $R_{15}$=$C_2H_5$; $R_{12}$, $R_{14}$, $R_{17}$, $R_{19}$=H; $R_{13}$, $R_{18}$=Cl; $R_{16}$=sulphopropyl.

Greater sensitivity is also achieved by adding at least one dye having the formula (III)

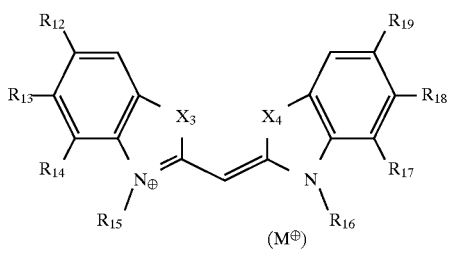

wherein $X_3$, $X_4$, $R_{12}$, $R_{13}$, $R_{14}$, $R_{15}$, $R_{16}$, $R_{17}$, $R_{18}$, $R_{19}$ and $M^{\oplus}$ have the above-mentioned meaning.

Suitable dyes having the formula (III) are:

III-1: $X_3$, $X_4$=S; $R_{12}$, $R_{14}$, $R_{17}$, $R_{19}$=H; $R_{13}$, $R_{18}$=Cl; $R_{15}$, $R_{16}$=sulphopropyl; $M^{\oplus}$=HN$(C_2H_5)_3^{\oplus}$;

III-2: $X_3$, $X_4$=S; $R_{12}$, $R_{17}$, $R_{19}$=H; $R_{13}$ and $R_{14}$ together —CH=CH—CH=CH—; $R_{18}$=Cl; $R_{15}$, $R_{16}$=sulphopropyl; $M^{\oplus}$=Na$^{\oplus}$;

III-3: $X_3$, $X_4$=S; $R_{12}$ and $R_{13}$ together —CH=CH—CH=CH—; $R_{14}$, $R_{17}$, $R_{19}$=H; $R_{18}$=Cl; $R_{15}$, $R_{16}$=sulphopropyl; $M^{\oplus}$=Li$^{\oplus}$;

III-4: $X_3$, $X_4$=S; $R_{12}$, $R_{13}$=CH$_3$; $R_{14}$, $R_{17}$, $R_{19}$=H; $R_{18}$=Cl; $R_{15}$=sulphopropyl, $R_{16}$=3-methylsulphopropyl; $M^{\oplus}$=HN$(C_2H_5)_3^{\oplus}$;

III-5: $X_3$, $X_4$=S; $R_{12}$=OCH$_3$; $R_{13}$=CH$_3$; $R_{14}$, $R_{17}$, $R_{19}$=H; $R_{18}$=Cl; $R_{15}$=sulphobutyl; $R_{16}$=sulphopropyl; $M^{\oplus}$=K$^{\oplus}$;

III-6: $X_3$=S; $X_4$=O; $R_{12}$, $R_{17}$, $R_{19}$=H; $R_{13}$ and $R_{14}$ together —CH=CH—CH=CH—; $R_{18}$=phenyl, $R_{15}$=sulphopropyl; $R_{16}$=sulphobutyl; $M^{\oplus}$=Na$^{\oplus}$;

III-7: $X_3$, $X_4$=S; $R_{12}$, $R_{17}$, $R_{19}$=H; $R_{13}$ and $R_{14}$ together

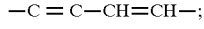

$R_{18}$=Cl; $R_{15}$, $R_{16}$=sulphopropyl; $M^{\oplus}$=Li$^{\oplus}$;

III-8: $X_3$, $X_4$=S; $R_{12}$, $R_{14}$, $R_{17}$, $R_{19}$=H; $R_{13}$, $R_{18}$=Cl; $R_{15}$=sulphopropyl; $R_{16}$=carboxyethyl;

III-9: $X_3$=S; $X_4$=O; $R_{12}$, $R_{19}$=H; $R_{13}$ and $R_{14}$ together and $R_{17}$ and $R_{18}$ together

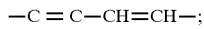

$R_{15}$, $R_{16}$=sulphopropyl; $M^{\oplus}$=Na$^{\oplus}$;

III-10: $X_3$, $X_4$=Se; $R_{12}$, $R_{14}$, $R_{17}$, $R_{19}$=H; $R_{13}$=OCH$_3$, $R_{18}$=CH$_3$; $R_{15}$, $R_{16}$=sulphopropyl; $M^{\oplus}$=NH$(C_2H_5)_3^{\oplus}$;

III-11: $X_3$=S; $X_4$=N—C$_2$H$_5$, $R_{12}$, $R_{17}$=H; $R_{13}$ and $R_{14}$ together

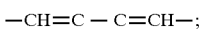

$R_{18}$=CN; $R_{19}$=Cl; $R_{15}$, $R_{16}$=sulphopropyl; $M^{\oplus}$=K$^{\oplus}$;

III-12: $X_3$, $X_4$=O; $R_{12}$, $R_{14}$, $R_{17}$, $R_{19}$=H; $R_{13}$, $R_{18}$=phenyl; $R_{15}$, $R_{16}$=sulphopropyl; $M^{\oplus}$=Na$^{\oplus}$;

III-13: $X_3$, $X_4$=O; $R_{12}$, $R_{19}$=H; $R_{13}$ and $R_{14}$ together and $R_{17}$ and $R_{18}$ together

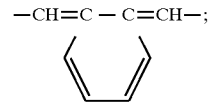

$R_{15}$, $R_{16}$=sulphopropyl; $M^{\oplus}$=NH$(C_2H_5)_3^{\oplus}$;

III-14: $X_3$, $X_4$=O; $R_{12}$ and $R_{13}$ together

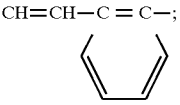

$R_{14}$ and $R_{19}$=H; $R_{17}$ and $R_{18}$ together

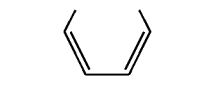

$R_{15}$, $R_{16}$=sulphopropyl; $M^{\oplus}$=K$^{\oplus}$;

III-15: $X_3$=O; $X_4$=S; $R_{12}$ and $R_{13}$ together and $R_{18}$ and $R_{19}$ together

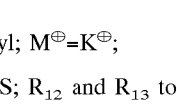

$R_{14}$, $R_{17}$=H; $R_{15}$, $R_{16}$=sulphopropyl; $M^{\oplus}$=Na$^{\oplus}$;

III-16: $X_3$, $X_4$=S; $R_{12}$, $R_{19}$=H; $R_{13}$ and $R_{14}$ together and $R_{17}$ and $R_{18}$ together —CH=CH—CH=CH—; $R_{15}$, $R_{16}$=sulphopropyl; $M^{\oplus}$=Li$^{\oplus}$.

EXAMPLES

Example 1

Using the sensitising dye I-22, a light-sensitive photographic material was prepared as follows:

41.3 mg of a stabiliser ST, dissolved in 6.88 g of water and 0.12 g of NaOH are added to 100 g of a silver bromide iodide emulsion containing 10 mol-% of AgI with a wide particle size distribution and a predominant size by volume of 1.41 μm. After 45 minutes' stirring at 45° C., 23.4 mg of I-22 dissolved in 25 ml of methanol are added and stirring is continued for a further 15 minutes at 40° C. 20 mg of ST-A dissolved in 4 g of water are then added, the mixture stirred for 10 minutes at 40° C., and then 1.26 g of the coupler K-1 and 1.89 g of the coupler K-2, both emulsified together in 50.4 g of water, 3.15 g of tricresyl phosphate and 0.22 g of wetting agent NM, are added with stirring. After the addition of 120.0 ml of 5 wt. % aqueous gelatin and 100 ml of water, another 81 mg of wetting agent NM are added, dissolved in a mixture of 1.6 ml of water and 0.4 ml of methanol. After a further 15 minutes, the emulsion is poured out and subsequently hardened.

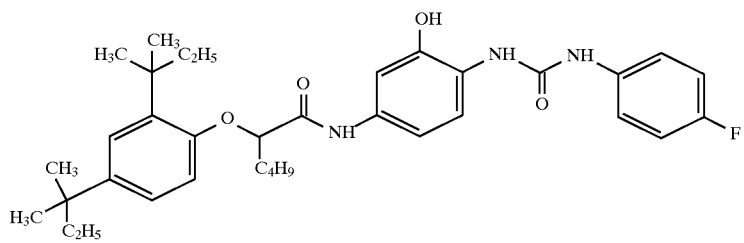

K-1

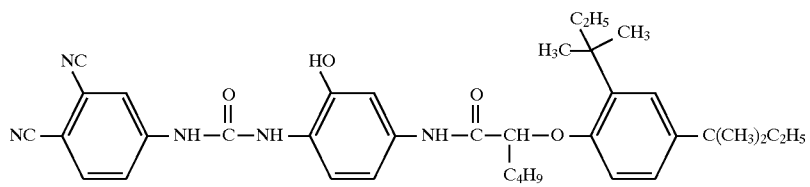

K-2

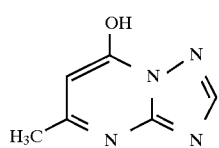

ST

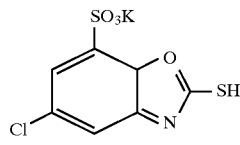

ST-A

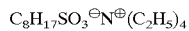

$C_8H_{17}SO_3^{\ominus} N^{\oplus}(C_2H_5)_4$

NM

Further materials were prepared in the same way, with the difference that instead of the sensitising dye I-22 according to the invention, other sensitising dyes were used, as may be seen from Table 1. The sensitivity of the materials prepared in this way was determined. To this end, samples of the materials were exposed behind an optical wedge and underwent colour negative processing according to "The Journal of Photographic Science, 1974, pages 597, 598". The results are summarised in Table 1.

TABLE 1

| Dye | Sensitivity* | Type of sample |
|-----|---|---|
| I-22 | 1.00 | Invention |
| I-23 | 0.99 | Invention |
| I-26 | 0.97 | Invention |
| I-46 | 1.04 | Invention |
| A-1 | 0.91 | Comparative sample |
| A-2 | 0.91 | Comparative sample |
| A-3 | 0.93 | Comparative sample |
| A-4 | 0.88 | Comparative sample |
| A-5 | 0.92 | Comparative sample |

*Sensitivity standardised to that of I-22.

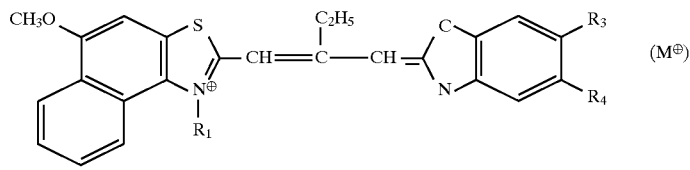

(M$^\oplus$)

A-1 $R_1$, $R_2$=sulphopropyl; X=O; $R_3$, $R_5$=H; $R_4$=Cl; $M^\oplus$=HN(C$_2$H$_5$)$_3^\oplus$ A-2 $R_1$, $R_2$=sulphopropyl; X=O; $R_3$, $R_5$=H; $R_4$=phenyl; $M^\oplus$=HN(C$_2$H$_5$)$_3^\oplus$ A-3 $R_1$, $R_2$=sulphopropyl; X=O; $R_3$=H; $R_4$ and $R_5$ together —CH=CH—CH=CH—; $M^\oplus$=HN(C$_2$H$_5$)$_3^\oplus$ A-4 $R_1$, $R_4$=CH$_3$; $R_2$=sulphobutyl; X=Se, $R_3$, $R_5$=H;

A-5 $R_1$=sulphopropyl; $R_2$=C$_2$H$_5$; X=S; $R_3$=OCH$_3$; $R_4$ and $R_5$ together —CH=CH—CH=CH—.

Example 2

As described in Example 1, the sensitivities of materials prepared accordingly were determined, these having been sensitised additionally with a sensitising dye having the formula (II). The dye having formula (II) was used in the same quantity as the dye having formula (I) and as the comparative dyes. The same surface coating as in Example 1 was obtained with each dye pair. The sensitivity values obtained are shown in Table 2.

TABLE 2

| Dye | Sensitivity* | Type of sample |
|---|---|---|
| I-22/II-22 | 1.00 | Invention |
| I-23/II-22 | 1.01 | Invention |
| I-26/II-24 | 1.00 | Invention |
| A-1/II-24 | 0.89 | Comparative sample |
| A-2/II-24 | 0.94 | Comparative sample |
| A-3/II-22 | 0.91 | Comparative sample |
| A-4/II-22 | 0.85 | Comparative sample |

*Sensitivity standardised to the combination I-22/II-22.

Example 3

As described in Example 1, the sensitivities of materials prepared accordingly were determined, these having been sensitised additionally with two sensitising dyes having the formula (II). The same surface coating as in Example 1 was obtained with each dye triad. The sensitivity values are shown in Table 3.

TABLE 3

| Dye mixture | Mixing ratio | Sensitivity* | Type of sampe |
|---|---|---|---|
| I-22/II-22/II-23 | 1/2/0,1 | 1.00 | Invention |
| I-23/II-24/II-23 | 1/3/0,1 | 1.02 | Invention |
| I-26/II-24/II-23 | 1/4/0,2 | 1.01 | Invention |
| I-22/II-24/II-20 | 1/3/0,1 | 1.12 | Invention |
| A-1/II-22/II-23 | 1/2/0,1 | 0.94 | Comparison |
| A-2/II-24/II-23 | 1/3/0,2 | 0.93 | Comparison |
| A-3/II-22/II-23 | 1/4/0,2 | 0.96 | Comparison |

*Sensitivity standardised to the triad I-22/II-22/II-23.

Example 4

Using the sensitising dye I-1, a light-sensitive material was prepared as follows.

15.2 mg of I-1 dissolved in 25 ml of methanol are added to 100 g of a silver chloride emulsion after 45 minutes at 40° C. After 60 minutes' stirring at 40° C., 6 mg of ST-B dissolved in 6 ml of water, 112.5 mg of potassium bromide dissolved in 12 ml of water and 2.2 mg of ST-C dissolved in 5 ml of dilute sodium hydroxide solution are added. After 10 minutes' stirring at 40° C., 50 ml of water, 81 g of a 20 wt. % gelatin solution, 14.0 g of coupler K-4 and 6.2 g of coupler K-5 emulsified in 204 g of water and 33.3 g of oil former O-1 (polymeric mixed ester of adipic acid and a mixture of 1,3- and 1,4-butane diol and 2-ethylpropane diol) and 0.32 g of NM-1 dissolved in 8 ml of water are added. After a further 15 minutes, the emulsion is poured out and subsequently hardened.

TABLE 4

| Dye | Sensitivity* | Type of sample |
|---|---|---|
| I-1 | 1.00 | Invention |
| I-20 | 1.11 | Invention |
| I-13 | 0.98 | Invention |
| I-11 | 0.95 | Invention |
| I-12 | 0.93 | Invention |
| B-1 | 0.86 | Comparison |
| B-2 | 0.73 | Comparison |
| B-3 | 0.87 | Comparison |
| III-6 | 0.90 | Comparison |
| III-3 | 0.90 | Comparison |
| III-1 | 0.87 | Comparison |
| III-2 | 0.91 | Comparison |
| III-17 | 0.85 | Comparison |

*Sensitivity standardised to that of I-1.

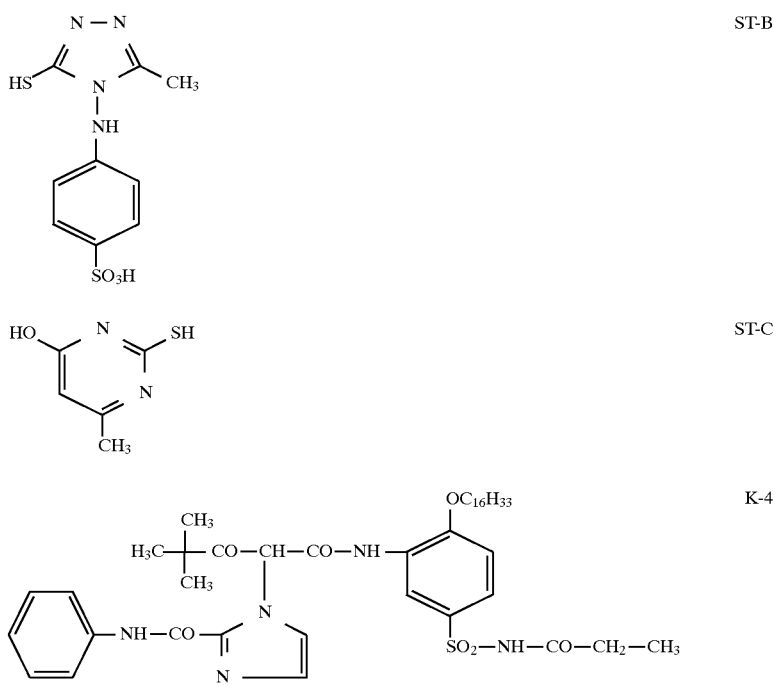

-continued

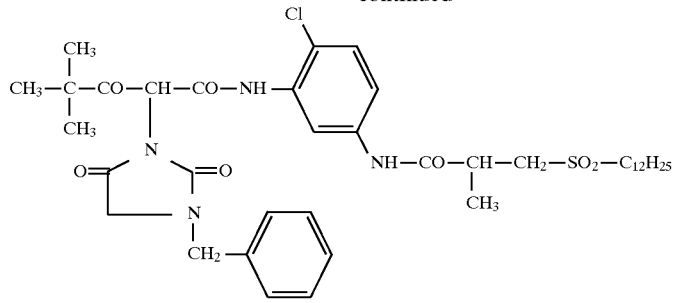

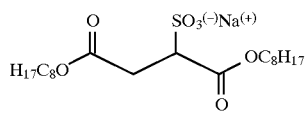

NM-1

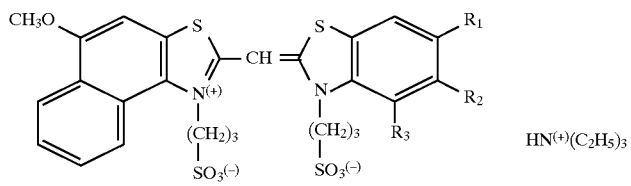

HN(+)(C₂H₅)₃

K-5

B-1 R₁=H; R₂ and R₃ together —CH=CH—CH=CH—;

B-2 R₁, R₂, R₃=H;

B-3 R₁=CH₃; R₂ and R₃ together —CH=CH—CH=CH—.

Example 5

As described in Example 4, the sensitivities of materials prepared accordingly were determined, these having been sensitised additionally with a sensitising dye having the formula (III). The same surface coating as in Example 4 was obtained with each dye combination. The sensitivity values obtained are shown in Table 5.

TABLE 5

| Dye mixture | Mixing ratio | Sensitivity* | Type of sample |
|---|---|---|---|
| III-6/I-1 | 4/1 | 1.00 | Invention |
| I-11/III-2 | 3/1 | 0.99 | Invention |
| I-13/III-2 | 1/1 | 0.97 | Invention |
| I-15/III-1 | 1/1 | 0.95 | Invention |
| B-1/III-1 | 1/2 | 0.92 | Comparison |
| B-2/II-2 | 1/1 | 0.84 | Comparison |
| B-3/III-6 | 1/1 | 0.93 | Comparison |

*Sensitivity standardised to the combination III-6/I-1.

Example 6

41.3 g of the stabiliser ST, dissolved in 6.88 g of water and 0.12 g of 1N NaOH were added to 100 g of a silver bromide iodide emulsion containing 10 mol-% of AgI (silver content expressed as AgNO₃: 201 g per kg of emulsion) with a wide particle size distribution and a predominant size by volume of 1.41 μm. After 60 minutes' stirring at 45° C., 4.9 mg of the dye I-20 dissolved in 5 ml of methanol were added, and after 20 minutes' stirring 9.9 mg of the dye II-1 dissolved in 10 ml of methanol, and after a further 20 minutes 1.6 mg of the dye II-10 dissolved in 2 ml of methanol, after which the mixture is stirred for a further 60 minutes at 40° C. 20 mg of ST-A dissolved in 4 g of water are then added, the mixture stirred for 10 minutes at 40° C. and then 4 g of the coupler K-3 emulsified in 4 g of tricresyl phosphate and 58 g of water are added with stirring. After the addition of 120 mg of 5 wt. % of aqueous gelatin solution, 81 mg of wetting agent NM dissolved in a mixture of 1.6 ml of water and 0.4 ml of methanol were added. After a further 15 minutes the emulsion is poured out and subsequently hardened.

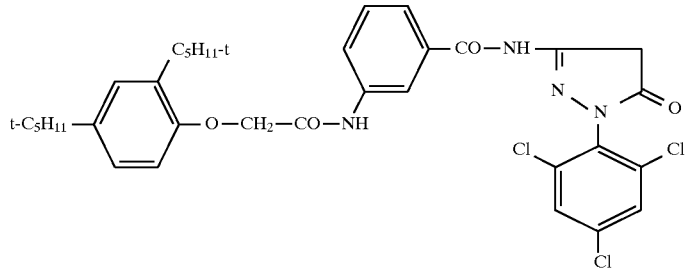

K-3

Further materials were prepared in the same way, with the difference that instead of the sensitising triad I-20/II-1/II-10 with the dye I-20 according to the invention, other sensitising dye combinations were used (Table 6), the same surface coating being obtained in each case. The sensitivity of the materials prepared in this way was determined. To this end, samples of the materials were exposed behind an optical wedge and underwent colour negative processing according to "The Journal of Photographic Science, 1974, pages 597, 598". The results are summarised in Table 6.

TABLE 6

| Dye mixture | Mixing ratio | Sensitivity* | Type of sample |
| --- | --- | --- | --- |
| II-1/II-10/I-10 | 4/1/0,3 | 0.97 | Invention |
| II-1/II-12/I-20 | 3/1/0,2 | 1.00 | Invention |
| II-1/II-10/I-21 | 3/1/0,5 | 0.96 | Invention |
| II-1/II-10/II-14/I-20 | 4/1/0,3/0,2 | 1.03 | Invention |
| II-1/II-10/B-1 | 4/1/0,3 | 0.87 | Comparison |
| II-1/II-10/B-2 | 3/1/0,5 | 0.85 | Comparison |
| II-1/II-12/B-3 | 3/1/0,2 | 0.89 | Comparison |
| II-1/II-10/II-14/B-3 | 4/1/0,3/0,2 | 0.91 | Comparison |

*Sensitivity standardised to the combination II-1/II-12/I-20.

I claim:

1. A photographic recording material comprising at least one light-sensitive silver halide emulsion layer, the silver halide of which is spectrally sensitized with at least one cyanine dye having the formula (I)

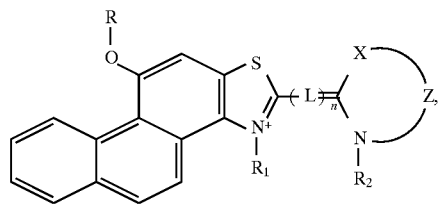

wherein

X is O, S, Se, $NR_3$ or —CH=CH—,

R is alkyl, n is 1, 3, 5 or 7

$R_1$, $R_2$, $R_3$ are identical or different and are alkyl, arylalkyl, sulphoalkyl, carboxyalkyl, —$(CH_2)_m$—$SO_2$—NH—$SO_2$-alkyl, —$(CH_2)_m$—SO—NH—CO-alkyl, —$(CH_2)_m$—$CO_2$—NH—$SO_2$-alkyl or —$(CH_2)_m$—$CO_2$—NH—CO-alkyl, L is a an unsubstituted or substituted methine group, m is a number from 1 to 5, and Z is the radical required to complete a substituted or unsubstituted thiazoline, substituted or unsubstituted thiazole, substituted or unsubstituted benzothiazole, substituted or unsubstituted naphthothiazole, substituted or unsubstituted phenanthrothiazole, substituted or unsubstituted anthrathiazole, substituted or unsubstituted 2-quinoline, substituted or unsubstituted 4-quinoline, substituted or unsubstituted indole, substituted or unsubstituted oxazole, substituted or unsubstituted benzoxazole, substituted or unsubstituted naphthoxazole, substituted or unsubstituted phenanthrooxazole, substituted or unsubstituted anthraoxazole, substituted or unsubstituted selenazole, substituted or unsubstituted benzselenazole, substituted or unsubstituted naphthoselenazole, substituted or unsubstituted imidazole, substituted or unsubstituted benzimidazole or substituted or unsubstituted naphthoimidazole and the substituents of at least 2 methine groups may be linked to rings.

2. A photographic recording material according to claim 1, wherein the silver halide is additionally spectrally sensitized with at least one cyanine dye having the formula (II)

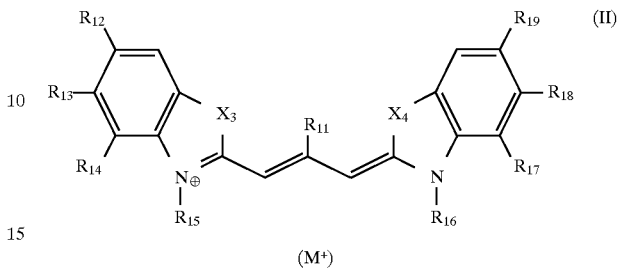

wherein $X_3$ and $X_4$ are identical or different and are O, S, Se or $NR_{20}$, wherein $R_{20}$ is alkyl, $R_{11}$ is H, $CH_3$ or $C_2H_5$, $R_{12}$, $R_{13}$, $R_{14}$, $R_{17}$, $R_{18}$ and $R_{19}$ are identical and or different and are H, alkyl, halogen, CN, aryl, alkoxy or $CF_3$, or $R_{12}$ and $R_{13}$; $R_{13}$ and $R_{14}$; $R_{17}$ and $R_{18}$; and/or $R_{18}$ and $R_{19}$ are the remaining members of a naphtho-, anthra-, phenanthro- or substituted naphthoazole, $R_{15}$ and $R_{16}$ are identical or different and are alkyl aralkyl, sulphoalkyl, carboxyalkyl, —$(CH_2)_m$—$SO_2$—$NHSO_2$-alkyl, —$(CH_2)_m$—$SO_2$—NHCO-alkyl, —$(CH_2)_m$—$CONHSO_2$-alkyl or —$(CH_2)_m$—CONHCO-alkyl or m is a number from 1 to 5, and $M^+$ is a cation optionally required for charge equalization.

3. A photographic recording material according to claim 1, wherein the silver halide is additionally sensitized with at least one cyanine dye having the formula (III)

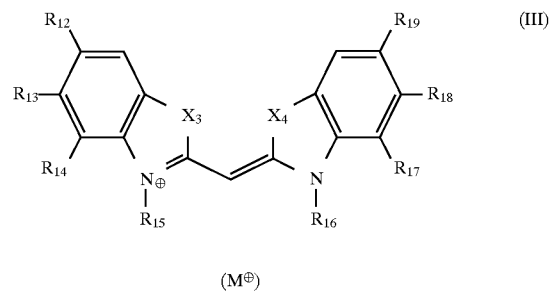

wherein $X_3$ and $X_4$ are identical or different and are O, S, Se or $NR_{20}$, wherein $R_{20}$ is an C alkyl $R_{11}$ is H, $CH_3$ or $C_2H_5$, $R_{12}$, $R_{13}$, $R_{14}$, $R_{17}$, $R_{18}$ and $R_{19}$ are identical and or different and are H, alkyl, halogen, CN, aryl, alkoxy or $CF_3$, or $R_{12}$ and $R_{13}$; $R_{13}$ and $R_{14}$; $R_{17}$ and $R_{18}$; and/or $R_{18}$ and $R_{19}$ are the remaining members of a naphtho-, anthra-, phenanthro- or substituted naphthoazole $R_{15}$ and $R_{16}$ are identical or different and are alkyl aralkyl, sulphoalkyl, carboxyalkyl, —$(CH_2)_m$—$SO_2$—$NHSO_2$-alkyl, —$(CH_2)_m$—$SO_2$—NHCO-alkyl, —$(CH_2)_m$—$CONHSO_2$-alkyl or —$(CH_2)_m$—CONHCO-alkyl m means a number from 1 to 5, and $M^+$ means a cation optionally required for charge equalization.

4. A photographic recording material according to claim 2, wherein the silver halide is additionally sensitized with at least one cyanine dye having the formula (III)

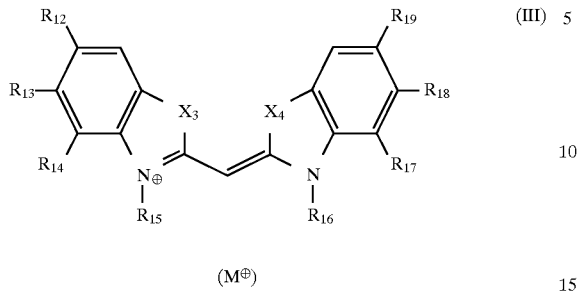

(III)

wherein $X_3$ and $X_4$ are identical or different and are O, S, Se or $NR_{20}$, wherein $R_{20}$ is an alkyl $R_{11}$ is H, $CH_3$ or $C_2H_5$, $R_{12}$, $R_{13}$, $R_{14}$, $R_{17}$, $R_{18}$ and $R_{19}$ are identical and or different and are H, alkyl, halogen, CN, aryl, alkoxy or $CF_3$, or $R_{12}$ and $R_{13}$; $R_{13}$ and $R_{14}$; $R_{17}$ and $R_{18}$; and/or $R_{18}$ and $R_{19}$ are the remaining members of a naphtho-, anthra-, phenanthro- or substituted naphthoazole $R_{15}$ and $R_{16}$ are identical or different and are alkyl aralkyl, sulphoalkyl, carboxyalkyl, —$(CH_2)_m$—$SO_2$—$NHSO_2$-Alkyl, —$(CH_2)_m$—$SO_2$—NHCO-alkyl, —$(CH_2)_m$—$CONHSO_2$-alkyl or —$(CH_2)_m$—CONHCO-Alkyl m means a number from 1 to 5, and $M^+$ means a cation optionally required for charge equalization.

5. The color photographic recording material as claimed in claim 1, wherein

R is $CH_3$

L is CH.

6. The color photographic material as claimed in claim 5, wherein

Z completes a substituted or unsubstituted benzothiazole.

7. The color photographic recording material as claimed in claim 1, wherein the cyanine dye of the formula 1, is of the formula

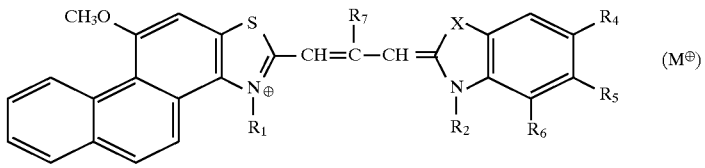

wherein $R_1$, $R_2$, and X are defined in claim 1 and $R_4$, $R_5$, $R_6$, and $R_7$ independently of one another are $H_1$, halogen, alkyl, alkoxy, aryl, N-pyrrolyl, 2-thienyl, 3-thienyl, 2-furanyl or 3-furanyl; or $R_5$ and $R_6$ together mean

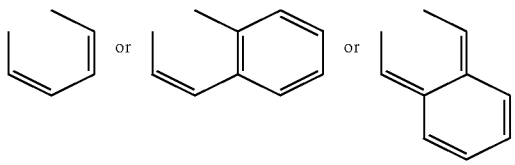

or $R_4$ and $R_5$ together mean

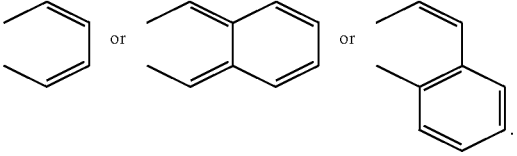

8. The color photographic recording material as claimed in claim 2, wherein $R_{20}$ is $C_1$–$C_4$-alkyl.

9. The color photographic recording material as claimed in claim 3, wherein $R_{20}$ is $C_1$–$C_4$-alkyl.

10. The color photographic recording material as claimed in claim 2, wherein the dye of the formula I corresponds to formula (Ia)

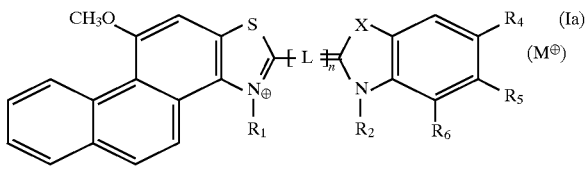

wherein $R_1$, $R_2$, L and X are defined in claim 1,

X means O, S, Se or $NR_8$, $R_6$ is alkyl with 1 to 4 carbon atoms;

L means an optionally substituted methine group;

n means 1, 3 or 5;

$R_4$, $R_5$, and $R_6$ independently of one another are H, halogen, alkyl, alkoxy, aryl, N-pyrrolyl, 2-thienyl, 3-thienyl, 2-furanyl or 3-furanyl; or $R_5$ and $R_6$ together mean

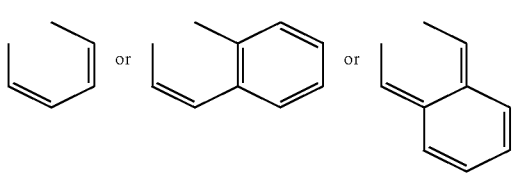

or $R_4$ and $R_5$ together mean

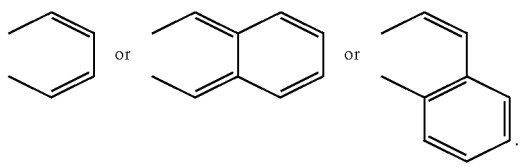

11. The photographic recording material according to claim 2, wherein $R_{12}$ and $R_{13}$; $R_{13}$ and $R_{14}$; $R_{17}$ and $R_{18}$; $R_{18}$ and $R_{19}$ together form a substituted naphthoazole, wherein the substituents are methoxy and/or chlorine.

12. The photographic recording material according to claim 3, wherein $R_{12}$ and $R_{13}$; $R_{13}$ and $R_{14}$; $R_{17}$ and $R_{18}$; and/or $R_{18}$ and $R_{19}$ are the remaining members of a substituted naphthoazole, wherein the substituents are methoxy and/or chlorine.

13. The photographic recording material according to claim 1, wherein L is a substituted methine group where the methine group is substituted with $C_2H_5$.

* * * * *

UNITED STATES PATENT AND TRADEMARK OFFICE
CERTIFICATE OF CORRECTION

Page 1 of 4

PATENT NO. : 5,858,639
DATED : January 12, 1999
INVENTOR(S) : Michael Missfeldt

It is certified that error appears in the above-identified patent and that said Letters Patent is hereby corrected as shown below:

Column 4, line 20, "$R_4$ and $R_5$" should read -- $R_5$ and $R_6$--.

Column 4, line 21, "$R_5$ and $R_6$" should read -- $R_4$ and $R_5$--.

In the table at the bottom of columns 3 and 4, in item I-1, $R_1$: "$(CH_2)_2SO_3^{\ominus})$" should read --$(CH_2)_3SO_3^{\ominus})$--.

In the table at the bottom of columns 3 and 4, in item I-14, $R_4$: "-CH=CH- =CH)" " should read -- -CH=CH-CH=CH- --.

In the table at the bottom of columns 5 and 6, in item I-35, $R_2$: "$(CH_2)_3SO_3^{\ominus})$" should read --$(CH_2)_4SO_3^{\ominus})$--.

UNITED STATES PATENT AND TRADEMARK OFFICE
CERTIFICATE OF CORRECTION

PATENT NO. : 5,858,639
DATED : January 12, 1999
INVENTOR(S) : Michael Missfeldt

It is certified that error appears in the above-identified patent and that said Letters Patent is hereby corrected as shown below:

In the table at the bottom of columns 7 and 8, in item I-50, M: "I*)" should read -- I$^e$) --.

In the table at the top of columns 9 and 10, in item I-51, $R_1$: "⊕" should read -- ⊖ --.

In the table at columns 9 and 10, in item I-52, $R_1$: "⊕" should read -- ⊖ --.

In the table at columns 9 and 10, in item I-52, $R_2$: "⊕" should read -- ⊖ --.

In the table at columns 9 and 10, in item I-53, $R_1$: "⊕" should read -- ⊖ --.

In the table at columns 9 and 10, in item I-53, $R_2$: "⊕" should read -- ⊖ --.

In the table at columns 9 and 10, in item I-54, $R_1$: "⊕" should read -- ⊖ --.

In the table at columns 9 and 10, in item I-54, $R_2$: "⊕" should read -- ⊖ --.

UNITED STATES PATENT AND TRADEMARK OFFICE
CERTIFICATE OF CORRECTION

PATENT NO. : 5,858,639
DATED : January 12, 1999
INVENTOR(S) : Michael Missfeldt

It is certified that error appears in the above-identified patent and that said Letters Patent is hereby corrected as shown below:

In the table at columns 9 and 10, in item I-55, $R_1$: "⊕" should read -- ⊖ --.

In the table at columns 9 and 10, in item I-55, $R_2$: "⊕" should read -- ⊖ --.

In the table at columns 9 and 10, in item I-56, $R_1$: "⊕" should read -- ⊖ --.

In the table at columns 9 and 10, in item I-56, $R_2$: "⊕" should read -- ⊖ --.

In the table at columns 9 and 10, in item I-57, $R_1$: "⊕" should read -- ⊖ --.

In the table at columns 9 and 10, in item I-57, $R_2$: "⊕" should read -- ⊖ --.

Please cancel the first formula at the top of columns 11 and 12.

UNITED STATES PATENT AND TRADEMARK OFFICE
CERTIFICATE OF CORRECTION

Page 4 of 4

PATENT NO. : 5,858,639
DATED : January 12, 1999
INVENTOR(S) : Michael Missfeldt

It is certified that error appears in the above-identified patent and that said Letters Patent is hereby corrected as shown below:

In Example 1, the formula at the bottom of column 19 should be changed to read

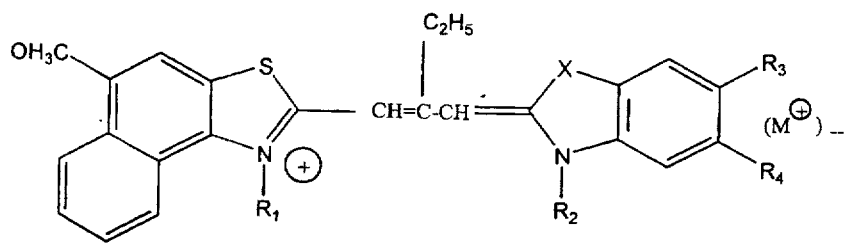

In claim 3, at column 26, line 21, delete "$R_{11}$ is H, $CH_3$ or $C_2H_5$,".

In claim 4, at column 27, line 20, delete "$R_{11}$ is H, $CH_3$ or $C_2H_5$,".

Signed and Sealed this

Twenty-first Day of September, 1999

Attest:

Q. TODD DICKINSON

*Attesting Officer*  *Acting Commissioner of Patents and Trademarks*